Patented Feb. 26, 1952

2,587,251

UNITED STATES PATENT OFFICE 2,587,251

METHOD OF ELECTRIC ARC WELDING

Paul Christiaan van der Willigen, Eindhoven, Netherlands, assignor to Hartford National Bank and Trust Company, Hartford, Conn., as trustee No Drawing. Application January 10, 1948, Serial No. 1,667. In the Netherlands February 12, 1947

2 Claims. (Cl. 219—10)

The invention relates to a method of electric arc-welding, in which a bare welding wire or coated welding rod is not made use of but an arc is struck directly between the work-pieces required to be joined by using a semi-conductive, slagging solid which is sufficiently conductive for initiating the arc and establishes a conductive contact between the slightly spaced work-pieces to be joined. According to this method the welding arc lasts a very short time and care is taken to see that one work-piece, generally a bar-shaped body, such as a bolt, is located on the other work-piece at a desired moment of time, this being performed by suitable choice of shape and size of the semi-conductive, slagging solid, so that a more or less complicated control-device for this purpose can be dispensed with.

Whereas in the case of coated welding rods use is made of a slagging coating material which evolves gas to an adequate extent as is required inter alia for obtaining a stable welding arc, experiments which resulted in the present invention revealed that such an evolution of gas is unfavourable for the said special method of electric arc-welding.

According to the invention in this method of electric arc-welding use is made of a semi-conductive, slagging solid which does not evolve gas during the welding operation, the duration of which it determines.

Such a slagging solid may be produced by preliminarily heating the slagging material at a high temperature.

Satisfactory results have been obtained, for example, by means of a mixture of 15% by weight of calcium carbonate, 13% by weight of calcium fluoride, 12% by weight of bentonite, 2% by weight of ferro-manganese, 3% by weight of ferro-silicon, 2% by weight of ferro-titanium and 53% by weight of pulverulent iron, this mixture being heated for one hour at 800° C. in a non-oxidizing atmosphere. The use of such a non-oxidizing atmosphere, for example heating in a reducing atmosphere or in vacuo, tends to prevent metal constituents from being oxidized during the heating process.

If the slagging solid is made from a mixture which does not contain gas-evolving substances such as calcium carbonate and water, preliminary heating may be dispensed with. By way of example I may mention a mixture of 20% by weight of calcium oxide, 13% by weight of calcium fluoride, 12% by weight of pulverulent glass, 2% by weight of ferro-manganese, 3% by weight of ferro-silicon, 2% by weight of ferro-titanium and 50% by weight of pulverulent iron. The slagging solid may be produced from this mixture under pressure.

The presence of the said comparatively large supply of pulverulent metal in the mixture tends to provide the slagging solid with a conductivity which suffices to bring about a conductive contact between the work-pieces to be joined for initiating the arc.

For a better understanding of the invention it should be noted that if slagging material is used which does not satisfy the requirement according to the invention, the gas escaping from it during the transient heating blasts with such a force against the metal just molten that an insufficient quantity of molten metal is left at this area to ensure a strong weld. This disadvantage is obviated by the invention.

What I claim is:

1. A method of electric arc-welding in which an arc is struck between the metallic work-pieces required to be joined, comprising the steps of slightly spacing the work-pieces to be joined from each other, placing a non-gas evolving semi-conductive slagging solid of a predetermined shape and size in position to establish a conductive contact between the spaced work-pieces, passing a current of electricity through the work-pieces and slagging solid to initiate an arc between the work-pieces through the slagging solid, and after the arc has burnt for a short time, dependent upon said predetermined shape and size of said slagging solid to so allow moving the work-pieces into contact with each other, then moving the work-pieces into such contact with each other, and interrupting the current.

2. A method of electric arc-welding in which an arc is struck between the metallic work-pieces required to be joined, comprising the steps of slightly spacing the work-pieces to be joined from each other, placing a non-gas evolving semi-conductive slagging solid of a predetermined shape and size and comprising a mixture of 20% by weight of calcium oxide, 13% by weight of calcium fluoride, 12% by weight of pulverulent glass, 2% by weight of ferro-manganese, 3% by weight of ferro-silicon, 2% by weight of ferro-titanium, and 50% by weight of pulverulent iron, in position to establish a conductive contact between the spaced work-pieces, passing a current of electricity through the work-pieces and slagging solid to initiate an arc between the work-pieces through the slagging solid and after the arc has burned for a short time dependent upon said predetermined shape and size of said slagging solid, to so allow moving the work-pieces into contact with each other, then moving the work-pieces into such contact with each other, and interrupting the current.

PAUL CHRISTIAAN van der WILLIGEN.

REFERENCES CITED

The following references are of record in the file of this patent:

UNITED STATES PATENTS

| Number | Name | Date |
| --- | --- | --- |
| Re. 22,108 | Crecca | June 9, 1942 |
| 2,326,865 | Kennedy | Aug. 17, 1943 |
| 2,384,403 | Somers | Sept. 4, 1945 |
| 2,413,370 | Palmer | Dec. 31, 1946 |
| 2,474,531 | Keir et al. | June 28, 1949 |